United States Patent Office 3,398,111
Patented Aug. 20, 1968

3,398,111
CHEMICAL PROMOTION OF A RUBBER-FILLER COMPOSITION WITH TETRAMETHYLENE BIS-(AZIDOFORMATE)
William D. Willis, Limestone Acres, Del., assignor to Hercules Incorporated, a corporation of Delaware
No Drawing. Filed Jan. 25, 1965, Ser. No. 427,919
11 Claims. (Cl. 260—33.6)

ABSTRACT OF THE DISCLOSURE

The process involves chemical promotion of a rubber-filler composition, followed by addition of conventional rubber compounding ingredients and curing of the resulting mixture. The promoter utilized is tetramethylene bis (azidoformate).

---

This invention relates to vulcanizate compositions and a process for their production. More particularly, the invention relates to the use of an azidoformate chemical promoter in vulcanization processes and the improved vulcanizates thereby produced.

Normally vulcanization is carried out by the high temperature curing of a rubber polymer, in the presence of a filler, curing agents, and various compounding ingredients such as accelerators, activators, antioxidants and the like.

Chemical promoters have been used in the past to improve the modulus and tensile strength of vulcanizates. This improvement is believed to result from polymer-filler interaction during high temperature mixing. However, a major shortcoming of previously known promoters is their staining and discoloring effect on the resulting vulcanizates, preventing their use in white and light colored products such as, for example, white sidewall tires. Further, promoters now in use do not provide a "quick set" to vulcanizates during early stages of curing, and, as a result, the vulcanizates produced have undesirably high porosities.

In accordance with this invention it has unexpectedly been found that superior vulcanizates are produced when a preliminary polymer-filler treatment step is carried out prior to the incorporation of conventional compounding ingredients. This preliminary step comprises incorporating a low concentration of tetramethylene bis(azidoformate) (hereinafter referred to as TBAF) into the polymer-filler blend, and intimately contacting these components for a short period of time, on the order of several minutes, at an elevated temperature. On subsequent curing, polymer-filler blends which have been pretreated in this manner produce vulcanizates having greatly enhanced modulus, tensile strength and electrical properties and which are suitable for use in white or light color products. The use of this preliminary step also results in quick setting of the vulcanizates on curing which minimizes porosity in the cured products. This low porosity is particularly desirable in butyl rubber compositions.

The following examples are presented to illustrate this invention. All parts and percentages are by weight unless otherwise specified.

Examples 1–3

Three samples of a wire insulation type ethylene-propylene copolymer, 43 weight percent of $C_2$, ML–8 at 212° F.=40 (EPR 404 produced by Enjay Chemical Co.) and hydrous and anhydrous aluminum silicate (Iceberg Clay, produced by Burgess Pigment Co.) were mixed with (1) no promoter, (2) TBAF (47% by weight on a low bulk density fumed silica) and (3) a conventional commercial promoter (N,4-dinitroso-N-methylaniline), respectively, with the compounds being present in the amounts indicated in Table 1. This mixing was carried out on a 3 x 8 inch two-roll mill for approximately ten minutes at roll temperatures ranging from 125° F. to 150° F. The stocks were removed from the rolls and the temperature of the rolls was raised to 320° F. the compounds were then mill mixed on the hot rolls for five minutes, and the resulting stocks were then removed from the rolls and allowed to cool to room temperature. The compounding ingredients shown in Table 1 were incorporated into the respective stocks at a roll temperature of 150° F. The stocks and compounding ingredients were cross-cut and end rolled six times each to insure complete dispersion of the compounding ingredients. Press cures using a Di-cup (40% active dicumyl peroxide) curing agent were made in a preheated 3 x 6 x 0.075 inch mold maintained at 310° F. The curing time was 45 minutes.

The resulting vulcanizates were tested for modulus, tensile strength and lock of discoloration, and, as indicated by the data in Table 1, the sample in which the TBAF promoter was used had a vastly superior balance of these properties. The tensile properties were tested according to ASTM D–412 in these and all other examples.

TABLE 1

| Example No. | 1 | 2 | 3 |
|---|---|---|---|
| Rubber-Filler-Promoter: | | | |
| Ethylene-Propylene Copolymer | 100 | 100 | 100 |
| Aluminum Silicate | 150 | 150 | 150 |
| TBAF (47% active) | | 0.5 | |
| N,4-dinitroso-N-methylaniline (33⅓% active) | | | 1.0 |
| Compounding Ingredients: | | | |
| Zinc oxide (Kadox 15) | 5 | 5 | 5 |
| Polymerized trimethyl dihydroquinoline (Agerite Resin D) | 0.5 | 0.5 | 0.5 |
| Paraffinic petroleum oil (Faxam 40) | 5 | 5 | 5 |
| Sulfur (Tube Brand) | 0.3 | 0.3 | 0.3 |
| 40% Active dicumyl peroxide on calcium carbonate (Di-cup) | 7.5 | 7.5 | 7.5 |
| Mooney viscosity (ML–4 at 212° F.) | 85 | 101 | 94 |
| Color of Compound Stock | White | White | Tan |
| Vulcanizate Properties: | Unaged | | |
| Modulus at 300% elongation, p.s.i. | 265 | 470 | 305 |
| Tensile strength, p.s.i. | 595 | 705 | 605 |
| Elongation, percent | 780 | 600 | 765 |
| Shore A2 Hardness | 57 | 60 | 59 |
| Ultraviolet light discoloration (6 hours on white lacquer) | None | None | Tan |

Examples 4–6

The preliminary polymer-filler treatment step in these examples was the same as in Examples 1–3, with the same polymers, fillers and promoters being used in the same amounts. The resin-filler-promoter mixtures of Examples 4 and 5 were milled for nine minutes at 320° F. while the mixture of Example 6, containing TBAF, was milled for five minutes at 320° F. The curing step in Examples 4–6 was, however, carried out using an azidoformate curing system (TBAF) rather than the Di-cup cure used in Examples 1–3. The samples were cured at 310° F. for 45 minutes and tested for modulus and tensile strength. These properties and the curing compounds and amounts used are set forth in Table 2. Both unaged and aged samples of TBAF and N,4-dinitroso-N-methylaniline promoted vulcanizates were compared. This aging was carried out in a circulating air oven at 300° F. for five days. The results of these examples indicate that TBAF promotion is just as effective with TBAF vulcanization as it is with Di-cup vulcanization. The superior tensile properties in the aged samples resulting from TBAF promotion are particularly noteworthy.

TABLE 2

| Example No. | 4 | 5 | 6 |
|---|---|---|---|
| Rubber-Filler-Promoter: | | | |
| Ethylene-Propylene Copolymer (EPR 404) | 100 | 100 | 100 |
| Aluminum silicate (Iceberg clay) | 150 | 150 | 150 |
| N,4-dinitroso-N-methylaniline (33⅓% active) | | 0.5 | |
| TBAF (50% active) | | | 0.5 |
| Compounding Ingredients: | | | |
| Zinc oxide (Protox 166) | 5.0 | 5.0 | 5.0 |
| Polymerized trimethyl dihydroquinoline (Agerite Resin D) | 0.5 | 0.5 | 0.5 |
| Paraffin petroleum oil (Faxam 40) | 5.0 | 5.0 | 5.0 |
| Sulfur (Tube Brand) | 0.2 | 0.2 | 0.2 |
| TBAF (50% active) | | 5.0 | 5.0 |
| TBAF (50%) | 5.0 | | |
| Mooney Scorch (MS at 250° F.), Min. to 5-point rise | 17 | 12 | 14 |

| Vulcanizate Properties: | Unaged | Unaged | Aged | Unaged | Aged |
|---|---|---|---|---|---|
| Modulus at 200% Elongation, p.s.i. | 415 | 680 | | 710 | 890 |
| Tensile strength, p.s.i. | 605 | 735 | 400 | 775 | 890 |
| Elongation, percent | 880 | 395 | 185 | 405 | 275 |
| Shore A2 Hardness | 57 | 64 | 74 | 70 | 76 |

Examples 7–9

In these examples the rubbery polymer used was a mixture of the ethylene-propylene copolymer of Examples 1–6 and polyisobutylene (Vistanex L–80, mol. wt. 64,000–81,000), and the filler was an SAF carbon black (Philblack E). The preliminary polymer-filler treatment step was carried out using (7) no promoter (8) N,4-dinitroso-N-methylaniline and (9) TBAF (49.5% active), respectively. The polymer, filler and promoter, where used, were milled at 330° F. for ten minutes using the same equipment and procedures set forth in Examples 1–3. The curing agent was TBAF, and the stock was press cured for 45 minutes at 310° F. The compounding ingredients used, amounts used, and results of modulus and tensile strength tests on the resulting vulcanizates are set forth in Table 3. This data illustrates that TBAF is a highly effective promoter for high structure, reinforcing type, carbon black loaded, saturated polymers.

TABLE 3

| Example No. | 7 | 8 | 9 |
|---|---|---|---|
| Rubber-Filler-Promoter: | | | |
| Ethylene-propylene Copolymer | 75 | 75 | 75 |
| Polyisobutylene | 25 | 25 | 25 |
| SAF Carbon Black | 50 | 50 | 50 |
| N,4-dinitroso-N-methylaniline (33⅓% active) | | 0.5 | |
| TBAF (49.5% active) | | | 0.25 |
| Compounding Ingredients: | | | |
| Zinc oxide (Kadox 15) | 0.5 | 5.0 | 5.0 |
| Polymerized trimethyl dihydroquinoline (Agerite Resin D) | 0.5 | 0.5 | 0.5 |
| Sulfur (Tube Brand) | 0.3 | 0.3 | 0.3 |
| TABF (49.5% active) | 5.0 | | |
| TBAF (50% active) | | 5.0 | 5.0 |
| Vulcanizate Properties: | | | |
| Modulus at 300% Elongation | 695 | 1,945 | 2,235 |
| Tensile Strength, p.s.i. | 3,195 | 3,685 | 3,510 |
| Elongation, percent | 635 | 440 | 390 |
| Shore A Hardness | 58 | 63 | 64 |
| Break Set | 50 | 10 | 10 |

Examples 10–12

These examples show that TBAF promotion effects desirable improvements in modulus during early stages of cure. Further, at the optimum cure (45 minutes at 300° F.), the TBAF promoted sample exhibited higher tensile strength than the unpromoted control or the N,4-dinitroso-N-methylaniline promoted sample. These results are shown in Table 4. In these examples all three sample compositions contained 100 parts of polyisobutylene-isoprene copolymer, 1.5-2.0 mole percent isoprene (Butyl 365, produced by Enjay Chemical Co.), 50 parts of ISAF carbon black (Vulcan 6, produced by Cabot Chemical Co.), and 2.0 parts of naphthenic petroleum oil (Circosol 2XH, produced by Sun Oil Co.). In Example 10, no promoter was used; in Example 11, 0.5 part of N,4-dinitroso-N-methylaniline (33⅓% active) was used as a promoter; while in Example 12, 0.375 part of TBAF (50% active) was used. The preliminary polymer-filler treatment step comprised milling each of the above samples at 330° F. for ten minutes in the manner set forth in Examples 1–3. The samples were then cooled to room temperature and the following compounding ingredients added to each sample: zinc oxide (Protox 166), 50 parts; hydrogenated fish oil (Stearex beads, produced by Benney and Smith Co.), 1.0 part; tetramethyl thiuram disulfide (Methyl Tuads, produced by R. T. Vanderbilt Co.), 1.0 part; sulfur (tube brand), 2.0 parts. The curing equipment and procedure were the same as that used in Examples 1–3 with a curing temperature of 310° F. being used. Each of the samples was cured for 45 minutes with checks on the modulus and tensile strength being made at 15-minute intervals. These examples also illustrate the use of TBAF promoters with a conventional sulfur cure.

TABLE 4

| Vulcanizate Properties | Cure Time, Min. | Example No. 10 | 11 | 12 |
|---|---|---|---|---|
| | | Unaged | | |
| Modulus at 300% Elong., p.s.i. | 15 | 1,050 | 1,530 | 1,460 |
| | 30 | 1,560 | 2,175 | 1,805 |
| | 45 | 1,750 | 2,345 | 1,510 |
| Tensile Strength, p.s.i. | 15 | 2,645 | 2,745 | 2,800 |
| | 30 | 2,385 | 2,515 | 2,600 |
| | 45 | 2,430 | 2,510 | 2,930 |
| Elongation, p.s.i. | 15 | 500 | 470 | 495 |
| | 30 | 410 | 330 | 385 |
| | 45 | 400 | 300 | 330 |
| Shore A2 Hardness | 15 | 60 | 60 | 58 |
| | 30 | 65 | 62 | 65 |
| | 45 | 65 | 61 | 65 |
| Break Set, percent | 15 | 25 | 20 | 20 |
| | 30 | 30 | 10 | 20 |
| | 45 | 20 | 10 | 10 |

Examples 13–19

In these examples the equipment and procedures used were the same as those used in Examples 1–3. The polymer, filler, promoters, compounding and curing ingredients, and amounts of each used in each example are indicated in Table 5. The preliminary treatment and TBAF promotion were carried out at 330° F. for six minutes, except that the polymer and filler were mixed at room temperature in Example 13, and each sample was press cured at 307° F. for one hour, with each sample being tested for modulus and tensile strength at 20-minute intervals. These examples show that the presence of a small amount of processing oil during the preliminary polymer-filler treatment step is very advantageous to the promoting action of TBAF. Another conventional promoting agent, p-quinone dioxime, was compared to TBAF in these examples. The TBAF used was 41% active. A comparison of the properties of the products of Examples 13 and 14 indicates that hot mixing has no effect on the tensile properties of unpromoted vulcanizates.

TABLE 5

| Example No | 13 | 14 | 15 | 16 | 17 | 18 | 19 |
|---|---|---|---|---|---|---|---|
| Rubber—Filler—Promoter: | | | | | | | |
| Polyisobutylene-isoprene copolymer (1.5-20% isoprene) (Butyl 268, produced by Enjay Chem. Co.) | 100 | 100 | 100 | 100 | 100 | 100 | 100 |
| HAF carbon black (Philblack O, produced by Phillips Chem. Co.) | 50 | 50 | 50 | 50 | 50 | 50 | 50 |
| Paraffinic petroleum oil (Faxam 40, produced by Esso Refining Co.) | | | | | | 2.0 | |
| N,4-dinitroso-N-methylaniline (33% active) | | | 1.5 | | | | |
| p-Quinone dioxime (100% active) | | | | 0.2 | | | |
| TBAF (41% active) | | | | | 0.56 | 0.56 | 0.56 |
| Sulfur (Tube Brand) | | | | | | | 0.5 |
| Compounding Ingredients: | | | | | | | |
| Zinc Oxide (Kadox 15) | 5 | 5 | 5 | 5 | 5 | 5 | 5 |
| Hydrogenated fish oil (Stearex Beads) | 1 | 1 | 1 | 1 | 1 | 1 | 1 |
| Paraffinic petroleum oil (Faxam 40) | 5 | 5 | 5 | 5 | 5 | 3 | 5 |
| Tellurium diethyl dithiocarbamate (80% active) (Tellurac, produced by R. T. Vanderbilt Co.) | 1.2 | 1.2 | 1.2 | 1.2 | 1.2 | 1.2 | 1.2 |
| Benzothiozyl disulfide (Altax, produced by R. T. Vanderbilt Co.) | 1 | 1 | 1 | 1 | 1 | 1 | 1 |
| Sulfur (Tube Brand) | 2 | 2 | 2 | 2 | 2 | 2 | 2 |
| Mooney Viscosity (ML-4 at 212° F.) | 68 | 71 | 69 | 80 | 90 | 100 | 98 |
| Mooney Scorch (MS at 280° F.) Min. to 5-point rise | 13 | 14 | 13 | 12 | 10 | 10 | 12 |

| Vulcanizate Properties: | Press Cured at 370° F. | | | | | | |
|---|---|---|---|---|---|---|---|
| Modulus at 300% Elong., p.s.i.: | | | | | | | |
| Cure Time, Min.: | | | | | | | |
| 20 | 760 | 730 | 1,185 | 1,250 | 1,220 | 1,360 | 1,070 |
| 40 | 1,005 | 1,045 | 1,690 | 1,550 | 1,565 | 1,985 | 1,515 |
| 60 | 1,210 | 1,080 | 1,780 | 1,770 | 1,615 | 1,940 | 1,535 |
| Tensile Strength, p.s.i.: | | | | | | | |
| Cure Time, Min.: | | | | | | | |
| 20 | 2,375 | 2,365 | 2,555 | 2,835 | 2,425 | 2,695 | 2,415 |
| 40 | 2,300 | 2,135 | 2,590 | 2,825 | 2,635 | 2,795 | 2,550 |
| 60 | 2,245 | 2,310 | 2,570 | 2,570 | 2,520 | 2,870 | 2,560 |
| Elongation, Percent: | | | | | | | |
| Cure Time, Min.: | | | | | | | |
| 20 | 625 | 650 | 550 | 550 | 500 | 515 | 525 |
| 40 | 540 | 515 | 410 | 490 | 440 | 415 | 440 |
| 60 | 500 | 500 | 400 | 380 | 400 | 400 | 395 |
| Shore A2 Hardness: | | | | | | | |
| Cure Time, Min.: | | | | | | | |
| 20 | 52 | 53 | 50 | 49 | 52 | 55 | 51 |
| 40 | 59 | 58 | 54 | 52 | 59 | 58 | 57 |
| 60 | 58 | 60 | 52 | 50 | 60 | 57 | 58 |

Examples 20-21

The polymer used in these examples was an ethylene-propylene-dicyclopentadiene terpolymer (6.9 weight percent DCP, raw polymer Mooney viscosity, ML-4 at 212° F.=45). This polymer was selected because it is representative of polymers containing unsaturation as a pendent chain. These examples indicate that as little as 0.12 part per hundred parts of rubber of TBAF promoter markedly improves the level of modulus and tensile strength of carbon black loaded terpolymer compounds. The filler, promoter, compounding and curing ingredients used, the amounts of each are indicated in Table 6. The equipment and procedures used were the same as those set forth in Examples 1-3. The polymer-filler mixture was milled with the promoter (where used) for five minutes at 320° F., and the cure was carried out at 320° F. for 60 minutes after incorporation of the compounding ingredients. Samples were taken after 30, 45 and 60 minutes of cure for testing.

TABLE 6

| Example No | 20 | 21 |
|---|---|---|
| Rubber-Filler-Promoter: | | |
| Ethylene-propylene-decyclopentadiene terpolymer | 100 | 100 |
| HAF Carbon Black (Philblack O) | 50 | 50 |
| Processing Oil (Circosol 2XH) | 5 | 5 |
| TBAF (47% active) | | 0.25 |
| Compounding Ingredients: | | |
| Zinc Oxide (Kadox 15) | 3.0 | 3.0 |
| Hydrogenated fish oil (Stearex Beads) | 1.0 | 1.0 |
| Hydrogenated rosin (Staybelite Resin, Hercules Powder Co.) | 2.0 | 2.0 |
| Heavy Pine Tar | 0.5 | 0.5 |
| Polymerized trimethyl dihydroquinoline (Agerite Resin D) | 0.5 | 0.5 |
| Tetramethyl thiuram disulfide (Methyl Tuads) | 1.0 | 1.0 |
| 2-mercaptobenzothiazole (Captax, R. T. Vanderbilt Co.) | 0.5 | 0.5 |
| Sulfur (Tube Brand) | 1.0 | 1.0 |
| Mooney Viscosity (ML-4 at 212° F.) | 53 | 61 |

| | | Unaged |
|---|---|---|
| Vulcanizate Properties: | | |
| Modulus at 300% Elong., p.s.i.: | | |
| Cure Time, Min.: | | |
| 30 | 1,245 | 1,300 |
| 45 | 1,485 | 1,705 |
| 60 | 1,725 | 1,775 |
| Tensile Strength, p.s.i.: | | |
| Cure Time, Min.: | | |
| 30 | 3,050 | 3,040 |
| 45 | 3,220 | 3,445 |
| 60 | 3,395 | 3,500 |
| Elongation, percent: | | |
| Cure Time, Min.: | | |
| 30 | 550 | 560 |
| 45 | 510 | 500 |
| 60 | 515 | 500 |
| Shore A2 Hardness: | | |
| Cure Time, Min.: | | |
| 30 | 63 | 62 |
| 45 | 64 | 62 |
| 60 | 64 | 61 |
| Break Set, Percent: | | |
| Cure Time, Min.: | | |
| 30 | 20 | 15 |
| 45 | 20 | 10 |
| 60 | 10 | 5 |

Examples 22-23

The compositions of these examples were tested to show the effect of TBAF promotion on a carbon black-highly unsaturated rubber system. The polymer used in the examples was polybutadiene. The mixing conditions used simulated factory processing and were as follows: One-half of the polymer charge (400 parts) was mill mixed with the TBAF promoter to insure adequate dispersion and eliminate localized concentrations. The total polymer (800 parts) was then charged to a laboratory size "B" Banbury mixer (no heat added) with carbon black, zinc oxide and process oil of the types and in the amounts shown in Table 7. After mixing for two minutes, steam was applied to the rotors and sides of the mixer, raising the internal temperature to about 330°–340° F. The compound was allowed to mix at this temperature for five minutes. The total mixing time was about ten minutes. The charge was then removed from the mixer and allowed to cool to about 150° F., and at the same time the mixer was cooled to about 200° F. The cooled charge was returned to the mixer and mixed with the fatty acid and antioxidant shown in Table 7 for about two minutes at 200° F. The charge was then again removed from the mixer and placed on a 6 x 12 inch two-roll mill for about two minutes to observe processability.

The compounds were sheeted from the rolls and allowed to cool to room temperature prior to the adding of the curatives.

A small portion of each of the cooled rubber-filler blends (342 g.) was placed on a 6 x 12 inch two-roll mill maintained at about 150° F. roll temperature, and the sulfur and accelerator shown in Table 7 were incorporated. Curing was conducted in a preheated multicavity 3 x 6 x 0.075 inch compression type mold, maintained at 298° F. for periods of 30, 60 and 90 minutes. Samples were removed at 30-minute intervals and tested for tensile properties according to ASTM D–412. The results of these tests are shown in Table 7 and indicate that TBAF is an effective promoter for highly unsaturated rubbers, even at very low use concentrations (0.09 part per hundred parts of rubber). The TBAF promoted stock showed improved modulus and tensile strength and a higher resilience at the same hardness level than the unpromoted stock.

TABLE 7

| Example No. | 22 | 23 |
|---|---|---|
| Rubber-Filler-Promoter: | | |
| Polybutadiene | 800 | 800 |
| HAF Carbon Black (Philblack O) | 440 | 440 |
| Zinc Oxide | 24 | 24 |
| TBAF (47% active) | | 1.5 |
| Processing oil (Circosol 2XH) | 80 | 80 |
| Hydrogenated fish oil (Stearex Beads) | 16 | 16 |
| Diaryl p-phenylenediamines (Wingstay 100, Goodyear Tire and Rubber Co.) | 8 | 8 |
| Mooney Viscosity (ML-4 at 212° F.) | 52 | 55 |
| Compounding Ingredients: | | |
| N-oxydiethylene benzothiazole-2 sulfanamide (NOBS Special, American Cyanamid Co.) | 2.0 | 2.0 |
| Sulfur (Tube Brand) | 4.0 | 4.0 |
| Vulcanizate Properties: | | |
| Modulus at 300% Elong., p.s.i.: | | |
| Cure Time, Min.: | | |
| 30 | 1,405 | 1,660 |
| 60 | 1,650 | 1,650 |
| 90 | 1,860 | 1,940 |
| Tensile Strength, p.s.i.: | | |
| Cure Time, Min.: | | |
| 30 | 2,025 | 2,210 |
| 60 | 1,770 | 1,855 |
| 90 | 2,065 | 2,085 |
| Elongation, percent: | | |
| Cure Time, Min.: | | |
| 30 | 390 | 370 |
| 60 | 295 | 300 |
| 90 | 320 | 320 |
| Shore A2 Hardness: | | |
| Cure Time, Min.: | | |
| 30 | 51 | 51 |
| 60 | 55 | 55 |
| 90 | 55 | 55 |
| Bashore Resilience: | | |
| Cure Time, min.: | | |
| 30 | 42 | 46 |
| 60 | 46 | 47 |
| 90 | 44 | 45 |

Examples 24–25

These examples are designed to show that the TRAF promotion in the preliminary polymer-filler treatment step is not merely additional curing. The polymer used was a polyisobutylene-isoprene copolymer, 2.1 to 2.5 mole percent isoprene (Butyl 325, produced by Enjay Chemical Co.), and the filler was a combination of FEF carbon black (Philblack A, produced by Phillips Chemical Co.) and SRF carbon black (Pelletrex, produced by Cabot Chemical Co.). In Example 24 no TBAF promoter was used but six parts of TBAF per hundred parts of rubber was used in the cure, while in Example 25, 0.5 part TBAF per hundred parts of rubber was used as a promoter and only 5 parts TBAF per hundred parts of rubber was used in the cure. In Example 24, the rubber-filler-promoter mixture was milled at room temperature, while in Example 25 the mixture was milled for five minutes at 310° F. Both samples were cured at 310° F. for 30 minutes after the compounding ingredients were added.

TABLE 8

| Example No. | 24 | 25 |
|---|---|---|
| Rubber-Filler-Promoter: | | |
| Polyisobutylene-isoprene copolymer (Butyl 325) | 100 | 100 |
| FEF carbon black | 30 | 30 |
| SRF carbon black | 30 | 30 |
| Sulfur (Tube Brand) | 0.2 | 0.2 |
| TBAF (50% active) | | 0.5 |
| Compounding Ingredients: | | |
| Zinc oxide (Kadox 15) | 5.0 | 5.0 |
| Polymerized trimethyl dihydroquinoline (Agerite Resin D) | 0.5 | 0.5 |
| Paraffinic petroleum oil (Faxam 40) | 8.0 | 8.0 |
| TBAF (50% active) | 6.0 | 5.0 |
| Vulcanizate Properties: | | |
| Modulus at 300% Elong., p.s. | 945 | 1,320 |
| Tensile Strength, p.s.i. | 1,110 | 1,460 |
| Shore A2 Hardness | 57 | 57 |

The vulcanizates of this invention are produced by a two-step process, the first step being referred to herein as the "preliminary polymer-filler treatment step" or the "promotion step," and the second step being referred to as the "curing step." In the promotional step the rubber polymer used is brought into intimate contact with a filler and the TBAF promoter by mixing, blending or milling at an elevated temperature. This mixing is continued for several minutes at the elevated temperature and yields an improved filler-polymer dispersion which on the addition of suitable compounding ingredients and curing yields vulcanizates with superior modulus, tensile strength and electrical properties. These vulcanizates may be used in various rubber applications such as in the production of automobile tires, etc.

The rubber polymers which can be used in this process include a broad spectrum of saturated and unsaturated rubbers. Exemplary of the rubber polymers which can be used are ethylene-propylene copolymers, ethylene-propylene copolymer-polyisobutylene blend, butyl rubber (polyisobutylene-isoprene copolymer), ethylene-propylene-dicyclopentadiene terpolymers, polybutadiene, styrene-butadiene copolymers, butadiene-acrylonitrile copolymers, polyacrylate ester copolymers, polyether copolymers and terpolymers containing at least one unsaturated epoxide constituent (such as propylene oxide-allyl glycidyl ether copolymer or ethylene oxide-epichlorohydrin-allyl glycidyl ether terpolymer), chlorosulfonated polyethylene, silicone rubbers, polychloroprene, and natural rubbers.

Any suitable fillers can be used in the process including black and non-black (such as clay or mineral pigment) fillers. Exemplary of suitable fillers are mineral pigments such as aluminum silicates, talc, anhydrous silicas, silicates, calcium carbonates, and the like; and black fillers such as Super Abrasion Furnace carbon black, Intermediate Super Abrasion Furnace carbon black, High Abrasion Furnace carbon black, Fast Extrusion Furnace carbon black, and Semireinforcing Furnace carbon black. Light colored mineral pigment fillers are used where freedom from discoloration is desired in the vulcanizate product.

Any suitable method for addition of TBAF to the polymer and filler can be used. TBAF is generally introduced on a carrier, such as fumed silica, hydrated silica, or Easy Processing Channel Black. TBAF on the various carriers can, for example, be adsorbed on the surface of the filler in ethylene dichloride solution.

Only relatively minor amounts of TBAF need be used in the promotional step. The exact amount necessary will depend on the particular polymer-filler system being treated, but amounts ranging from about 0.05 part active TBAF per hundred parts of polymer to about 0.75 part active TBAF per hundred parts of polymer will produce beneficial results. The TBAF used in the promotional step is consumed during promotion at the elevated mixing temperatures either by thermal decomposition or other reaction and does not participate in the subsequent curing step.

The mixing of the polymer, filler and TBAF promoter can be carried out in a two-roll mill, blender or other suitable device. The mixing time must be sufficient to allow the desired promotion to occur and will generally be from about five minutes to about ten minutes. A mixing time as short as about two minutes can be satisfactorily used. During this mixing the polymer-filler-TBAF stock is maintained at an elevated temperature. Optimum results have been obtained using mixing temperatures in the range of about 300–340° F.; however, any mixing temperatures between about 250° F. and about 340° F. can be beneficially used.

The presence of a small amount of processing oil during the promotional step is very advantageous to the promoting action of TBAF. Any petroleum-based oil is suitable for this purpose such as, for example, paraffinic oils, naphthenic oils, and aromatic oils. Paraffinic oils are used in preparing white or light colored products. The oil can be present in an amount between about one and about ten parts per hundred parts of polymer.

After the mixing has been completed, it has been found to be advantageous to allow the polymer-filler mixture to cool, usually to room temperature. The temperature must be reduced to at least about 200° F. prior to addition of the curing ingredients to prevent scorching. The mixture is then ready for incorporation of the compounding ingredients and curing.

The compounding ingredients and curing step contemplated by this invention are the conventional ones generally used in the art. Among the compounding ingredients which can be used are accelerators, activators, antioxidants, copper inhibitors, mold lubricants, deodorants, retarders, secondary curing agents and vulcanizing agents. Accelerators serve the important function of speeding the vulcanization. Methyl Tuads (tetramethyl thiuram disulfide), Tellurac (tellurim diethyl dithiocarbamate), Altax (benzothiazole disulfide), NOBS Special (N-oxydiethylene benzothiazole-2-sulfamamide) and Captax (2-mercaptobenzothiazole) are examples of suitable accelerators. Activators also aid in reducing the period of vulcanization, stabilize the cure, and enhance the action of the accelerator. Examples of suitable activators are Kadox 15 and Protox 166 (zinc oxides) and Stearex beads. Other examples of suitable accelerators and activators can be found in "Compounding Ingredients for Rubber" by India Rubber World (1936) at pages 9–37 and 38–56, respectively. Examples of the remaining types of compounding ingredients, i.e., antioxidants, mold lubricants, etc., which can be used are illustrated in the foregoing specific examples and in "Compounding Ingredients for Rubber" by India Rubber World (1936) at pages 57–80.

These additional compounding ingredients are generally incorporated in the polymer-filler blend of the promotional step at an elevated temperature at which the blend is readily workable. The temperature selected is not critical and around 150° F. has been found to achieve relatively uniform mixing.

The vulcanizates can be cured with any conventional curing system, such as a sulfur-accelerator curing system, a Di-cup curing system or an azidoformate curing system, each of which is illustrated in the foregoing specific examples.

The procedure followed in the curing step is generally as set forth in the specific examples. Optimum cures can be obtained using curing temperatures between about 280° F. and about 340° F. and curing times of about 15–90 minutes. These temperatures and times can be varied, however, and, of course, the optimum conditions for any particular run will depend on the ingredients, product characteristics desired, and type curing system used. When sulfur curing systems, with accelerators, are used, any temperatures as low as room temperature or as high as about 340° F. can be used.

When a TBAF curing system is used, the amount of active TBAF added with the compounding ingredients will usually be between about 0.5 and about 3.0 parts per hundred parts of polymer. For most applications, about 2.5 parts TBAF curing agent per hundred parts of polymer is an effective curing amount.

In addition to TBAF, azidoformates generally may be used as the curing agents of this invention. Application Serial No. 289,427, filed June 20, 1963, teaches the use of azidoformates for curing rubber polymers to produce vulcanizates. The azidoformates which are set forth there and which are useful as curing agents in this invention are solids or oils having a boiling point of at least about 100° C. at a pressure of 70 mm. of mercury and having the general formula

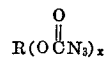

where $x$ is at least 1, preferably from about 1 to about 1 to about 100, and R is an organic radical, inert to modification reactions, containing at least one carbon atom per azidoformate group. Exemplary of the azidoformates which may be used are alkyl azidoformates such as n-octadecyl azidoformate, TBAF, pentamethylene-bis(azidoformate), and the like; cyclic azidoformates such as 1,4-cyclohexanedimethyl-bis(azidoformate), 2-(1-p-methyl-8-yloxy)ethyl azidoformate, and the like; aralkyl azidoformates such as α,α'-p-xylylene-bis(azidoformate), and the like; aromatic azidoformates such as phenyl azidoformate 2,2-isopropylidene-bis(p,p''-phenylazidoformate), and the like; azidoformate ethers; azidoformate thioethers; and other azidoformates containing functional groups which are inert to modification reactions, such as halogen, COOR, and

groups, and the like.

The amount of azidoformate curative used will generally be from about 0.01 part to about 20 parts per one hundred parts by weight of polymer. These azidoformates will generally be used in the same manner as TBAF, illustrated in the foregoing specific examples. Other details of their use are fully set forth in the application referred to above.

Obviously, many modifications and variations of this invention can be made without departing from the spirit and scope thereof and therefore only such limitations should be imposed as are indicated by the appended claims.

What I claim and desire to protect by Letters Patent is:

1. A process for producing vulcanized rubber which comprises intimately contacting a rubber polymer, a filler selected from the group consisting of carbon blacks and mineral pigments and from about 0.05 to about 0.75 part of tetramethylene bis(azidoformate) per one hundred parts of the rubber polymer for a period of time from about two to about ten minutes at an elevated temperature in the range between about 250° F. and about 340° F. to form a polymer-filler dispersion, mixing conventional rubber compounding ingredients with said dispersion, and curing the resulting mixture.

2. The process of claim 1 wherein the filler is a mineral pigment.

3. The process of claim 1 wherein the filler is a carbon black.

4. The process of claim 1 wherein the rubber polymer is selected from the group consisting of ethylene-propylene copolymer rubber, ethylene-propylene copolymer-polyisobutylene blend rubber, butyl rubber, ethylene-propylene-dicyclopentadiene terpolymer rubber, polybutadiene rubber, styrene-butadiene copolymer rubber, butadiene-acrylonitrile copolymer rubber, polyacrylate ester copolymer rubber, polyether polymer rubber containing at least one unsaturated epoxide constituent, chlorosulfonated polyethylene rubber, silicone rubber, polychloroprene rubber and natural rubber.

5. The process of claim 4 wherein the rubber polymer is butyl rubber.

6. The process of claim 4 wherein the rubber polymer is an ethylene-propylene copolymer rubber.

7. The process of claim 1 wherein the mixture is cured at an elevated temperature with a curing agent selected from the group consisting of dicumyl peroxide, sulfur and an azidoformate compound.

8. The process of claim 7 wherein the curing agent is tetramethylene bis(azidoformate).

9. The process of claim 1 wherein a minor amount of a petroleum-based oil is intimately contacted with said rubber polymer, said filler, and said tetramethylene bis(azidoformate).

10. A vulcanized rubber composition having good tensile properties, comprising a mixture of a rubber polymer and a filler selected from the group consisting of carbon blacks and mineral pigments which have been intimately contacted for a period of time from about two to about ten minutes at an elevated temperature in the range between about 250° F. and about 340° F. in the presence of from about 0.05 to about 0.75 part of tetramethylene bis(azidoformate) per one hundred parts of the rubber polymer and subsequently mixed with conventional rubber compounding ingredients and cured at an elevated temperature in the presence of a curing agent.

11. The composition of claim 10 wherein the filler is a mineral pigment and the cured composition has a clear coloration.

References Cited

UNITED STATES PATENTS 3,211,752  10/1965  Breslow _____ 260—349
3,284,421  11/1966  Breslow _____ 260—80.5

OTHER REFERENCES

E. I. du Pont de Nemours and Co., Inc., "ECD-330" Development Products Report No. 18, December 1961, pages 8 and 9.

ALLAN LIEBERMAN, *Primary Examiner.*

UNITED STATES PATENT OFFICE
CERTIFICATE OF CORRECTION

Patent No. 3,398,111                                      August 20, 1968

William D. Willis

It is certified that error appears in the above identified patent and that said Letters Patent are hereby corrected as shown below:

Column 2, line 21, "lock" should read -- lack --. Columns 3 and 4, TABLE 2, first column, line 11 thereof, "Paraffin" should read -- Paraffinic --; same table, first column, line 14 thereof, "(50%)" should read -- (50% active) --. Columns 5 and 6, TABLE 5, first column, line 2 thereof, "(1.5-20%" should read -- (1.5-2.0% --. Column 6, TABLE 6, third column, line 10 thereof, "62" should read -- 61 --; same table, third column, line 12 thereof, "61" should read -- 62 --. Column 7, line 58, "TRAF" should read -- TBAF --.

Signed and sealed this 13th day of January 1970.

(SEAL)
Attest:

Edward M. Fletcher, Jr.                             WILLIAM E. SCHUYLER, JR.
Attesting Officer                                            Commissioner of Patents